United States Patent [19]

Nakamatsu et al.

[11] Patent Number: 5,754,259
[45] Date of Patent: May 19, 1998

[54] OPTICAL FILTER FOR VISUAL DISPLAY TERMINALS

[75] Inventors: Osamu Nakamatsu; Hiroshi Matsumoto, both of Otsu, Japan

[73] Assignee: Toray Industries, Inc., Japan

[21] Appl. No.: 605,012

[22] PCT Filed: Jul. 18, 1995

[86] PCT No.: PCT/JP95/01429

§ 371 Date: Feb. 28, 1996

§ 102(e) Date: Feb. 28, 1996

[87] PCT Pub. No.: WO96/03834

PCT Pub. Date: Feb. 8, 1996

[30] Foreign Application Priority Data

Jul. 27, 1994 [JP] Japan .................. 6-175405

[51] Int. Cl.$^6$ .............. H04N 5/72; A47F 5/00; G02B 27/00
[52] U.S. Cl. .............. 348/835; 248/298.1; 248/309.1; 248/918; 248/924; 359/609
[58] Field of Search ................ 348/834, 835, 348/832, 819; 359/609, 601; 313/474; 248/918, 924, 287.1, 298.1, 309.1

[56] References Cited

U.S. PATENT DOCUMENTS

| | | | |
|---|---|---|---|
| 4,686,576 | 8/1987 | Dickie et al. ............... | 348/832 |
| 4,834,330 | 5/1989 | Swillinger . | |
| 4,905,089 | 2/1990 | Liang et al. ............... | 348/819 |
| 5,155,627 | 10/1992 | Keehn et al. ............... | 359/609 |
| 5,227,916 | 7/1993 | Theirl et al. . | |
| 5,320,318 | 6/1994 | Chen ...................... | 248/918 |
| 5,543,863 | 8/1996 | Lin ....................... | 348/835 |
| 5,627,606 | 5/1997 | Pember et al. ............. | 348/835 |
| 5,668,612 | 9/1997 | Hung ..................... | 348/819 |
| 5,689,371 | 11/1997 | Butterfield ............... | 359/609 |

FOREIGN PATENT DOCUMENTS

| | | |
|---|---|---|
| 0479366 A2 | 4/1992 | European Pat. Off. . |
| 0506346 A2 | 9/1992 | European Pat. Off. . |
| 2686760 | 7/1993 | France . |
| 29505365 | 6/1995 | Germany . |
| 2234144 | 1/1991 | United Kingdom . |

*Primary Examiner*—Scott Rogers
*Attorney, Agent, or Firm*—Austin R. Miller

[57] ABSTRACT

The present invention relates to an optical filter for visual display terminals, comprising a filter proper with a shape corresponding to a screen of the visual display terminal to have the filter mounted, and a frame for holding the filter proper, and can be mounted onto visual display terminals irrespective of the kind thereof, without giving any feeling of incompatibility. In the optical filter, the frame comprises a frame proper with a predetermined depth and a front shape corresponding to the main body of the visual display terminal, for holding the filter proper, and side frame members connected to be able to be horizontally adjusted in relative position against the frame proper. Also in the optical filter, the frame comprising a front frame with a shape corresponding to the main body of the visual display terminal, a top plate and side plates connected to the front frame tiltably at any optional positions, and corner members for connecting the top plate with the side plates.

15 Claims, 5 Drawing Sheets

Fig. 6

OPTICAL FILTER FOR VISUAL DISPLAY TERMINALS

TECHNICAL FIELD

The present invention relates to an optical filter for visual display terminals, in more detail, a wraparound type optical filter that comprises a frame covering not only the front but also the sides of the visual display terminal, and a filter proper that is provided at a predetermined position in the frame and has nearly the same shape as the display screen of the visual display terminal.

BACKGROUND ART

Visual display terminals using CRTs (cathode ray tubes), liquid crystals, optical fibers, LEDs, etc. have been widely used for computers, various video apparatuses, etc., and variously composed optical filters have been proposed or presented, to be mounted onto these visual display terminals. These visual display terminals can be roughly classified into the flat type for simply covering the front of the visual display terminal, and the above mentioned wraparound type. Of these types, the wraparound type is better because of the advantage that dust, etc. does not enter into the clearance between the visual display terminal and the filter, and also because contrast can be improved since external light does not directly come into the clearance between the visual display terminal and the filter. The Wraparound type also has a further other advantage that since it approximates the visual display terminal in appearance, it has little tendency to give a feeling of incompatibility when it is mounted.

However, since the wraparound type optical filter has its filter proper installed in a frame that is shaped like a relatively shallow rectangular dish, it can be well mounted onto the visual display terminal concerned. However, it can happen that the filter cannot be mounted onto a different visual display terminal, or that the frame is so large in comparison with the visual display terminal as to give a feeling of incompatibility. Therefore, if these undesirable events are to be avoided, many kinds of optical filters need to be specially sized for many kinds of visual display terminals.

To avoid these inconveniences, a filter composed as shown in Japanese Laid-open Patent Application (Kokai) No. 5-219463 (1993) is proposed. This filter has a relatively rigid frame having n sides approximating the shape and size of a visual display terminal, with a groove formed in (n-1) sides excluding the bottom side of the frame facing the visual display terminal, and has relatively flexible lip means of selected length corresponding substantially to the peripheral length of the (n-1) sides of the frame. The lip means comprises a tongue extending along the length of the lip means for mating with the frame groove to mount the lip means to the frame, and a rearwardly and inwardly extending relatively flexible concave lip that is joined to the tongue and extending along the length of the lip means to form a generally U-shaped configuration that is open along the bottom of the frame, so that the lip means slides onto the visual display terminal via the open side and into mounting engagement with the sides of the visual display terminal to adapt the bezel to the size of the visual display terminal.

In the filter composed as described in said Japanese Laid-open Patent Application (Kokai) No.5-219463 (1993), since the lip means only is flexible, and the frame is not flexible, the size of the filter as a whole cannot be changed. Therefore, since the filter must be prepared to suit the shape and size of the largest visual display terminal among those intended to have a filter mounted, the filter is inevitably large. If the filter is mounted onto a small visual display terminal, the frame is remarkably larger than the shape and size of the visual display terminal, and gives a feeling of incompatibility to some extent, impairing beautiful appearance. Furthermore, depending on the kind of the visual display terminal, the screen of the visual display terminal may deviate from the filter proper in position. Moreover, since the filter is mounted onto the visual display terminal by the flexibility of the lip means, any impact, etc. is highly likely to cause the filter to fall off.

DISCLOSURE OF THE INVENTION

The present invention has been made in view of the above problems. The object of the present invention is to present an optical filter for visual display terminals, which can be mounted onto any kinds of visual display terminals without any limitation and without any feeling of incompatibility.

An optical filter for visual display terminals of this invention comprises a frame comprising a frame proper with a predetermined depth and a front shape corresponding to the main body of the visual display terminal, for holding the filter proper, and side frame members that are connected on both sides of the frame proper and capable of being horizontally adjusted in relative positions against the frame proper.

With this optical filter for visual display terminals, the frame holding the filter proper with a shape corresponding to, and preferably with a nearly equal size to, the screen of the visual display terminal to have the filter mounted comprises the frame proper that has a shape corresponding to the main body of the visual display terminal and has a predetermined depth, and side frame members connected on both sides of the frame proper and capable of being horizontally adjusted in relative position against the frame proper. Therefore, if the side frame members are adjusted horizontally in relative positions to suit the shape and size of the visual display terminal, the optical filter can be mounted without giving any significant feeling of incompatibility. Since one kind of optical filter can be used for many kinds of visual display terminals, mass production of only a few kinds can be achieved.

In one form of optical filter for visual display terminals the frame proper is open at least at the bottom.

Since the frame proper of this optical filter is open at least at the bottom, the frame proper does not contact the visual display terminal when the filter is mounted onto the visual display terminal from above or removed upwardly, to assure very excellent handling convenience.

Another form of optical filter for visual display terminals further comprises a height adjusting member provided between the top face of the main body of the visual display terminal and the top face of the frame proper of the frame, for adjusting the relative position between the screen of the visual display terminal and the filter proper of the optical filter.

This optical filter for visual display terminals has additionally a height adjusting member to allow vertical adjustment in relative position. Therefore, if the filter proper deviates from the screen of the visual display terminal in vertical relative position depending on the kind of the visual display terminals, the height adjusting member provided between the top face of the main body of the visual display terminal and the top face of the frame can prevent deviation in vertical relative position.

Another form of optical filter for visual display terminals further comprises an engaging portion provided on the top face of the frame proper of the frame, and a filter mounting means detachably engaged with the engaging portion, and the filter mounting means is fixed on the top of the main body of the visual display terminal, to keep the filter mounted onto the visual display terminal.

This optical filter for visual display terminals is mounted on the visual display terminal by means of an engaging portion provided on the top face of the frame proper of the frame and an engaging portion of the filter mounting means fixed on the top of the main body of the visual display terminal, so that the optical filter is prevented from falling off by the engagement between the said engaging portions even if an impact, etc. is applied. Furthermore, since the filter mounting means is mounted at the center on the top face, the optical filter can be simply removed by lifting it upward.

Another optical filter for visual display terminals further comprises an engaging portion provided on the side frame member of the frame, and a filter mounting means to be detachably engaged with the engaging portion, and the filter mounting means is fixed on both sides of the main body of the visual display terminal, to keep the filter mounted onto the visual display terminal.

This optical filter for visual display terminals is mounted on the visual display terminal by means of an engaging portion provided on the side frame member of the frame and an engaging portion in the filter mounting means fixed on the visual display terminal, so that the optical filter is prevented from falling off by the engagement between the said engaging portions even if an impact, etc. is applied.

Another embodiment of optical filter for visual display terminals comprises a filter proper with a shape corresponding to the screen of the visual display terminal to have the filter mounted, and a frame for holding the filter proper, wherein the frame which comprises a front frame has a shape corresponding to the main body of the visual display terminal, a top plate and side plates connected with the front frame tiltably at any optional positions, and corner members for connecting the top plate with the side plates.

With this optical filter for visual display terminals, the frame the front frame has a shape corresponding to the main body of the visual display terminal, the top plate and side plates are connected with the front frame tiltably at any optional positions, and corner members are provided for connecting the top plate with the side plates. Therefore, if the top plate and side plates are tilted at any optional positions to suit the shape and size of the visual display terminal and connected by the corner members, the optical filter can be mounted onto the visual display terminal without giving any substantial feeling of incompatibility.

Another form of optical filter for visual display terminals further comprises an engaging portion provided on the top plate of the frame, and a filter mounting means detachably engaged with the engaging portion, and the filter mounting means is fixed on the top of the main body of the visual display terminal, to keep the filter mounted onto the visual display terminal.

With the above optical filter for visual display terminals, the engaging portion is provided in the top plate of the frame, and the filter mounting means to be detachably engaged with the engaging portion is fixed on the top face of the main body of the visual display terminal, for keeping the filter mounted to the visual display terminal. Therefore, even if an impact, etc. is applied, the engagement between the engaging portion and the filter mounting means can prevent the optical filter from falling off, but the optical filter can be simply removed by lifting it upward.

Another form of optical filter for visual display terminals further comprises an engaging portion provided on the side plate of the frame, and a filter mounting means to be detachably engaged with the engaging portion, and the filter mounting means is fixed on both sides of the main body of the visual display terminal, to keep the filter mounted to the visual display terminal.

With the above optical filter for visual display terminals, an engaging portion is provided in the side plate of the frame, and the filter mounting means to be detachably engaged with the engaging portion is fixed on the side face of the main body of the visual display terminal, for keeping the filter mounted to the visual display terminal. Therefore, even if an impact, etc. is applied, the engagement between the engaging portion and the filter mounting means can prevent the optical filter from falling off.

Figure 5:
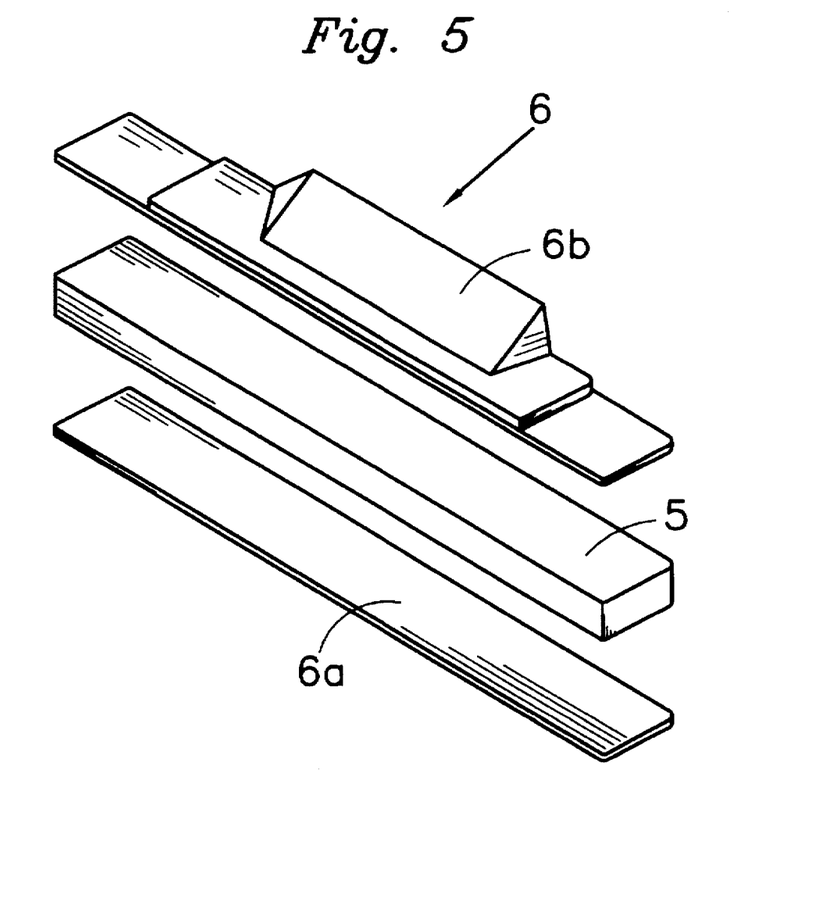
FIG. 5 is an exploded perspective view showing an example of the filter mounting means provided on the visual display terminal to have the optical filter of the present invention mounted.
Figure 6:
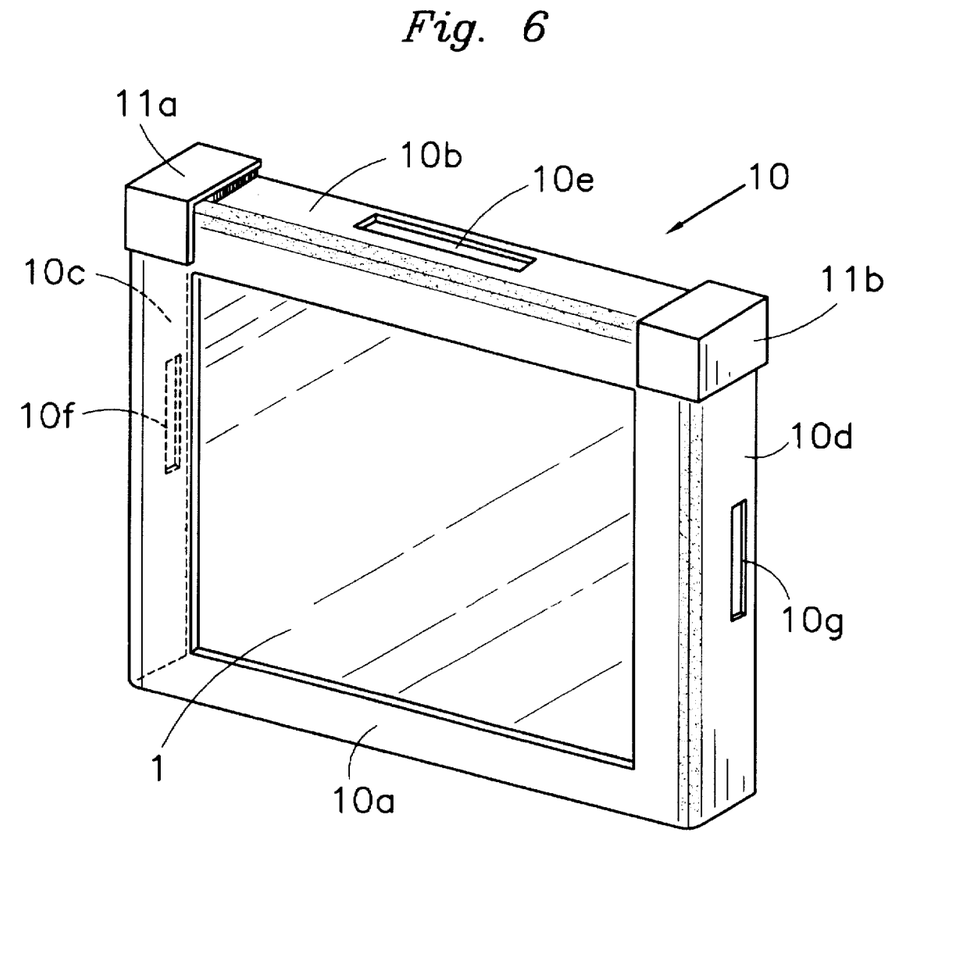
FIG. 6 is a front perspective view showing another example of the optical filter for visual display terminals of the present invention.

In the drawings, the following numerals denote the following parts respectively. 1: filter proper 2: frame 3: frame proper 4: side frame member 5: height adjusting member (FIG.5) 6: filter mounting means (FIG.5) 10: frame (FIG.6)

BEST MODE FOR CARRYING OUT THE INVENTION

The present invention is described below in detail in reference to the attached drawings showing examples.

Figure 1:
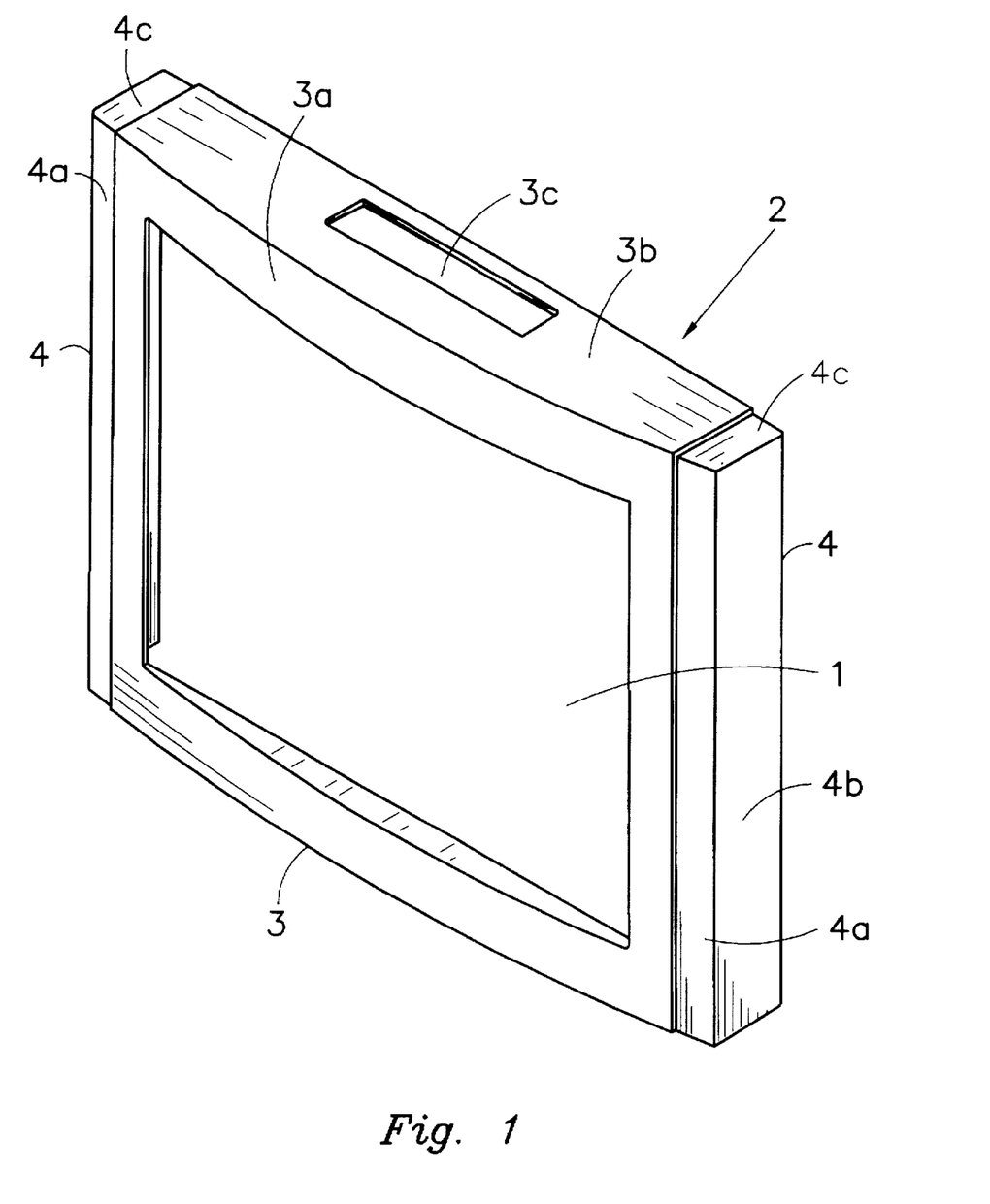
FIG. 1 is a front perspective view showing an example of the optical filter for visual display terminals of the present invention.
Figure 2:
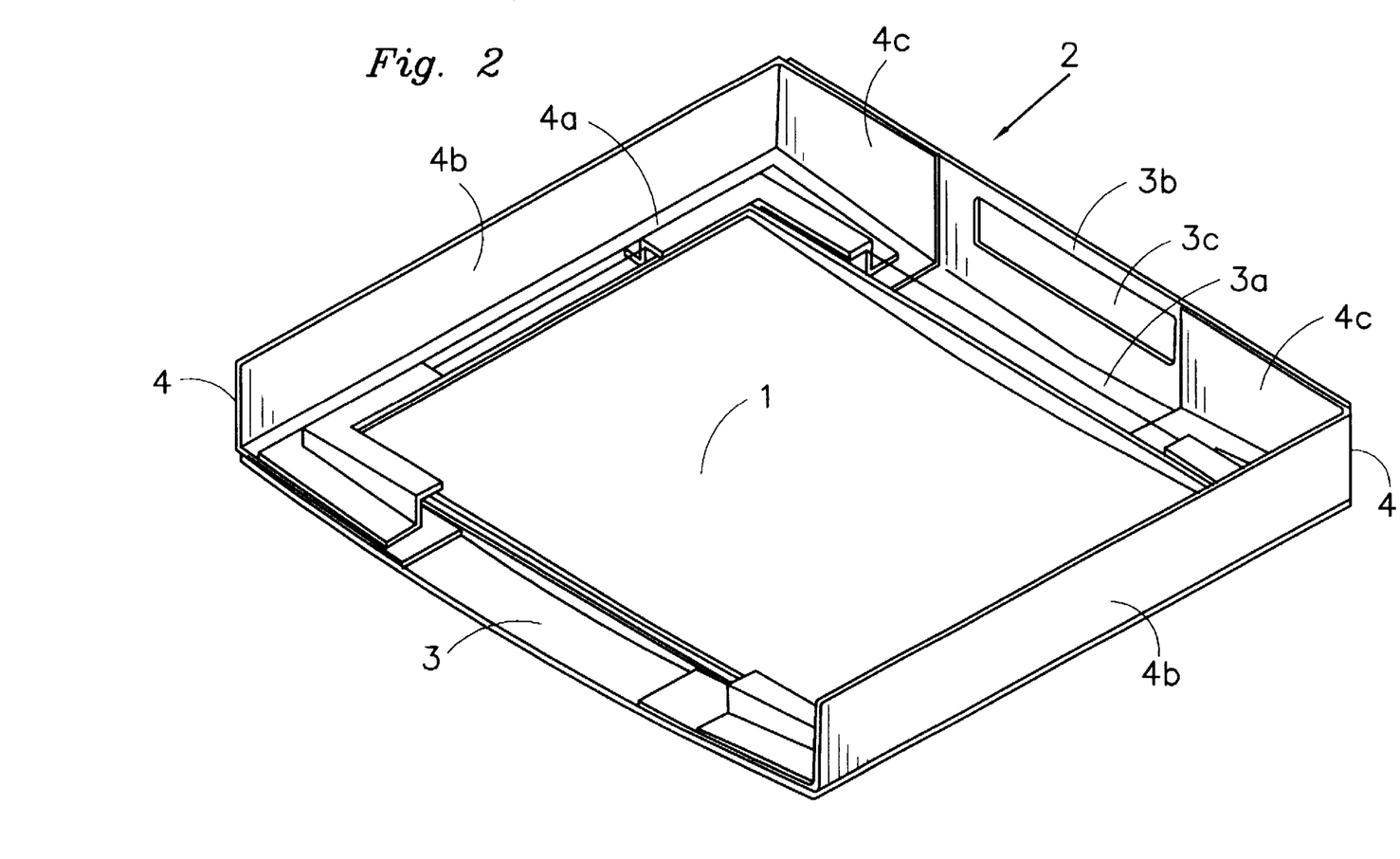
FIG. 2 is an upper rear perspective view showing said example of the optical filter for visual display terminals of the present invention.

An optical filter for visual display terminals shown in FIGS. 1 and 2 has a filter proper 1, a frame 2 for holding the filter proper 1, and side frame members 4 capable of being horizontally adjusted in relative position against a frame proper 3 of the frame 2.

The frame 2 comprises the frame proper 3 with a shape and size approximating the front shape and size of the visual display terminal (not illustrated) and a top plate member 3b extending horizontally rearward from a top end of a front plate member 3a of the frame proper 3, and the filter proper 1 is mounted to cover the opening formed at the center of the front plate member 3a. Moreover, at the center of the top plate member 3b, an opening 3c used as an engaging portion is formed. The opening 3c may also be substituted by a recess. The frame proper 3 may be produced, for example, by injection molding of ABS resin.

Each of the side frame members 4 comprises a front plate member 4a almost as high as the front plate member 3a, a side plate member 4b extending rearward from the side end of the front plate member 4a, and a top plate member 4c connected to the top end of the front plate member 4a and to the top end of the side plate member 4b, and is connected to the frame proper 3 horizontally slidably by a sliding mechanism 7 described later. The side frame member 4 is provided at least on either side of the frame proper 3, and it is preferable to provide one each on both sides of the frame proper 3, most preferably, in symmetrical form in view of function and design. Each of the front plate members 4a has a cutout formed at a predetermined position as required, lest it should cover the opening of the front plate member 3a when it is slid most toward the frame proper 3. The side frame members 4 may be produced, for example, by injection molding of ABS resin.

Figure 3:
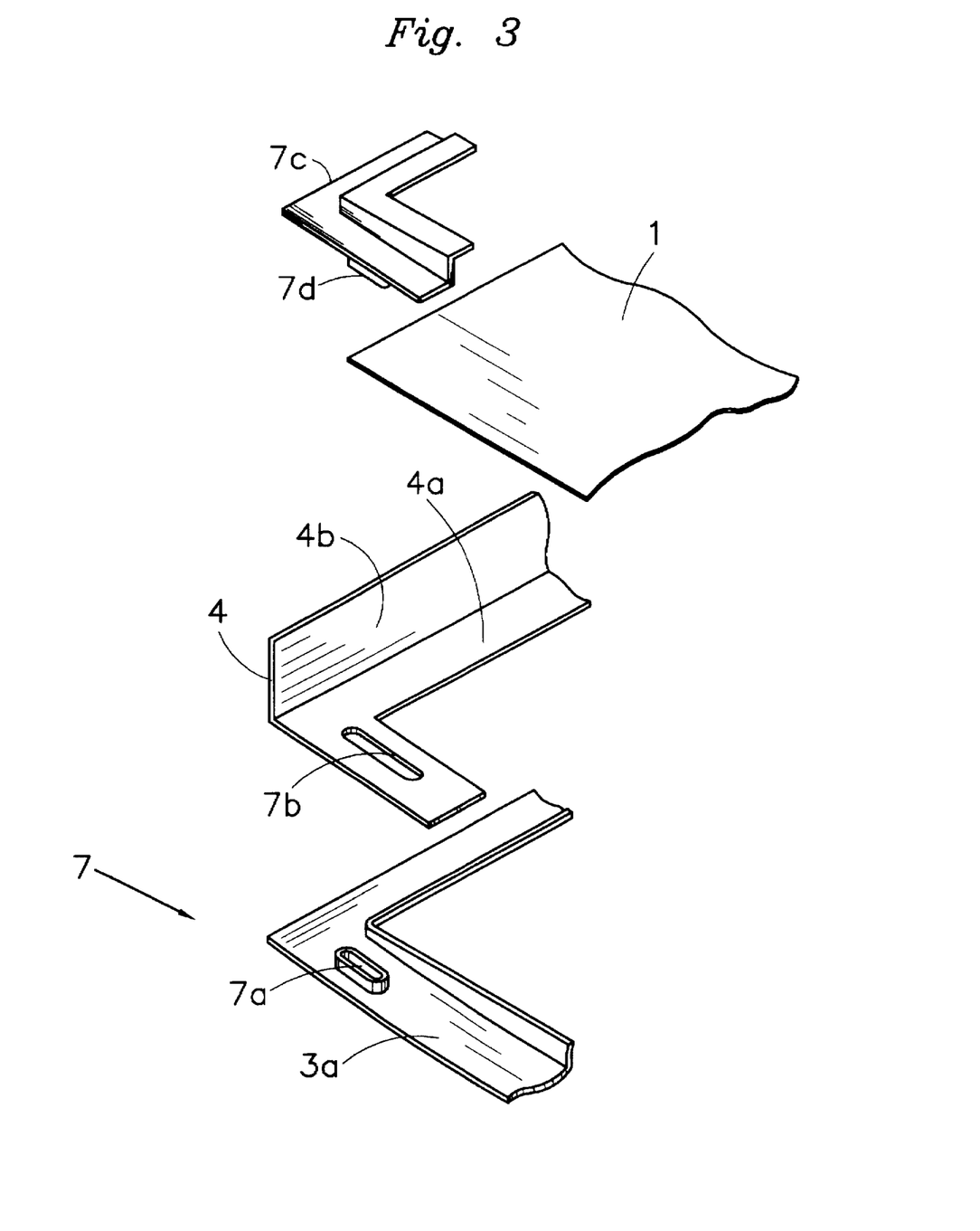
FIG. 3 is an exploded perspective view showing an essential portion of an example of the optical filter for visual display terminals of the present invention.
Figure 4:
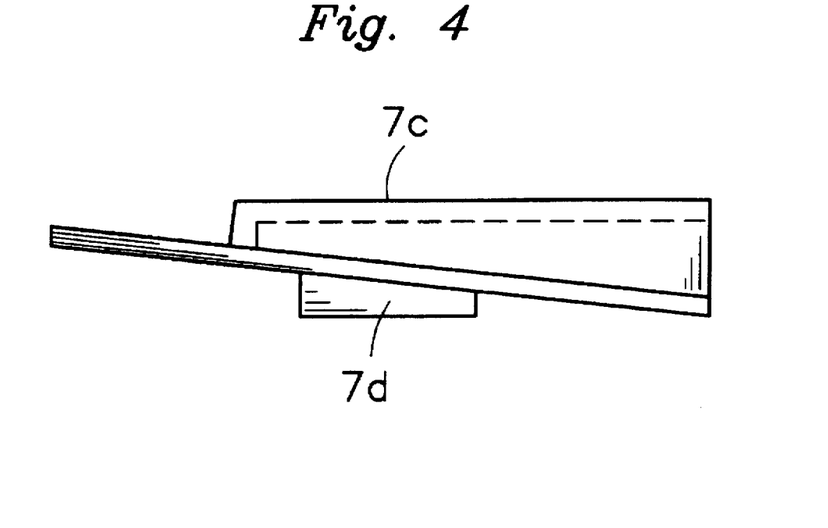
FIG. 4 is a side view showing another essential portion of said example of the optical filter for visual display terminals of the present invention.

The sliding mechanism 7 comprises, as shown in FIGS. 3 and 4, a key 7a provided at a predetermined position on the rear face of the front plate member 3a, and a key way 7b formed at a predetermined position of the corresponding front plate member 4a. The key 7a has a recess formed at a predetermined position, and the corresponding one of protrusions 7d provided at predetermined positions of a presser plate 7c for pressing the periphery of the filter proper 1 in engagement with the recess of the key 7a, to ensure the engagement between the key 7a and the key way 7b. The sliding mechanism 7 is provided at each of upper and lower predetermined positions of the respective side frame members 4. The sliding mechanism 7 may alternatively be realized by a linear motion bearing, a guide shaft and a bearing bush, a rack and a pinion, etc. instead of a key and a key way, but considering weight reduction, cost reduction, simpler assembling process, and the use frequency of the sliding mechanism, it is preferable to use a key and a key way as the sliding mechanism. Furthermore, in this example, the presser plate 7c is used to press the periphery of the filter proper 1 and to prevent disengagement between the key and the key way, but may also be substituted by another member to achieve these functions. It is preferable to form the key 7a apart from the side end of the front plate member 3a, for effectively suppressing the play of the side frame member 4.

FIG. 5 is an exploded perspective view showing the composition of the filter mounting member 6 provided on the top face of the main body of the visual display terminal, and comprises a base member 6a to be mounted at a predetermined position on the top face of the main body of the visual display terminal, a height adjusting member 5 to be mounted as required on the top face of the base member 6a, and a top member 6b to be mounted on the top face of the base member 6a or the height adjusting member 5. At a predetermined position on the top face of the top member 6b, a protrusion to be engaged with said opening 3c is formed. There respective members may be fixed by using screws, etc., but it is preferable to use a both-side adhesive tape, adhesive agent, Velcro or a repetitively usable pressure-sensitive adhesive tape, etc. for fixing them, since the respective members can be fixed without damaging the visual display terminal. The height adjusting member 5 may have a foldable portion to allow height adjustment by differently folding the foldable portion, but it is preferable to use or not to use at least one kind of height adjusting member 5 for height adjustment, or to selectively use height adjusting members 5 different in thickness for height adjustment. In the latter cases, the height adjusting member 5 is more reliable since it does not have any foldable portion. It is also possible to mount the filter mounting means 6 in either of the side members of the visual display terminal and to form the opening 3c to be engaged with the filter mounting means 6 in the corresponding side frame member. In this case, since the vertical position can be simply adjusted by changing the mounting position of the filter mounting means 6, the height adjusting member 5 is not required.

An optical filter for visual display terminals of the present invention as shown in FIG. 6 comprises a filter proper 1, a frame 10 for holding the filter proper 1, a top plate 10b connected to the top of the front frame 10a of the frame 10 tiltably at any optional position, side plates 10c and 10d connected to the sides of the front frame 10a tiltably at any optional positions, and corner members 11a and 11b for connecting the top plate 10b with the side plates 10c and 10d.

The front frame 10a of the frame 10 has a shape and size approximating the front shape and size of the visual display terminal (not illustrated) to have the filter mounted, and the filter proper 1 is mounted to cover the opening formed at the center of the front frame 10a. Moreover, the top plate 10b has an opening 10e formed to act as an engaging portion, and the side plates 10c and 10d have openings 10f and 10g formed to act as engaging portions. The openings 10e, 10f and 10g may be substituted by recesses. The openings 10e, 10f and 10f are formed to be engaged with the filter mounting means 6 as shown in FIG. 5 described before, and if the openings are formed, the filter can be simply and reliably mounted onto and removed from the visual display terminal preferably.

The portion bendable at any optional position for tiltably connecting the front frame 10a with the top plate 10b, and the portions bendable at any optional positions for tiltably connecting the front frame 10a with the side frames 10c and 10d may be prepared by using any material with bending resistance such as polypropylene resin or rubber, etc. At the portions, mechanisms such as hinges may also be adopted, but considering weight reduction, cost reduction and simpler assembling process etc., it is preferable to use a bendable material such as polypropylene resin.

The corner members 11a and 11b are provided to connect the top plate 10b with the side plates 10c and 10d, and may be produced, for example, by injection molding of ABS resin. For connection, it is preferable to use Velcro which allows easy disconnection and connection at any optional positions, but it is also possible that plural recesses or holes formed in the top plate and the side plates are engaged with protrusions of the corner members. Depending on the positions of connection, clearances may be formed in the front portion. So, it is preferable to form the corner members in such a way as to cover and hide the front portion as shown in FIG. 6.

When the optical filter for visual display terminals composed as shown in FIG. 1 is mounted onto a visual display terminal of an any model, both the side frame members 4 are horizontally slid to protrude from the frame proper 3, and in this state, the filter mounting means 6 mounted onto the top of the main body of the visual display terminal is engaged with the opening 3c of the frame proper 3. Then, the front plate member 3a of the frame proper 3 is pivotally rotated to be almost parallel to the screen of the visual display terminal, and subsequently the side frame members 4 are slid in the direction reverse to the previous sliding direction, to suit the width of the visual display terminal, for completing the mounting of the optical filter onto the visual display terminal. In this state, since the width of the optical filter is almost equal to the width of the visual display terminal, it gives little feeling of incompatibility, presenting good appearance.

Furthermore, when the optical filter for visual display terminals as shown in FIG. 6 is mounted onto a visual display terminal of an any model, the top plate and the side plates are properly tilted at any optional positions to suit the shape and size of the visual display terminal, and the top plate is connected with the side plates by the corner members, to mount the filter onto the visual display terminal, without giving any substantial feeling of incompatibility.

Moreover, when the optical filter is not used, it can be compactly folded after removing the corner members effectively for storing and transport.

When the visual display terminal and the filter proper 1 are considerably out of alignment in the vertical direction, the deviation can be properly corrected by using or not using the height adjusting member 5 of the filter mounting means 6, or using a height adjusting member different in height.

Even though not referred to specifically in the above description, if the screen of the visual display terminal is different in size, a differently sized optical filter need be used. However, if the sizes of the screens are almost the same (for example, in a range from 14 to 15 inches), making the side frame members 4 slidable in a predetermined range (for example, about 40 mm for a screen size range of 14 to 15 inches) considering the differences among makers and models allows the optical filter to be used generally irrespective of the differences among makers and models. As a result, mass production of a few kinds can be effected, to allow cost reduction. Furthermore, if the optical filters for visual display terminals are transported and stored with their size kept at a minimum, space can be saved.

The optical filter for visual display terminals according to this invention allows the optical filter to be mounted by adjusting the horizontal relative position of the side frame members to suit the shape and size of the visual display terminal to have the filter mounted, without giving any substantial feeling of incompatibility. In addition, since one kind of optical filter can be used for many kinds of visual display terminals, mass production of a few kinds can be achieved.

The optical filter for visual display terminals according to one embodiment has a frame proper which is open at least at the bottom. So, when the optical filter is mounted onto the visual display terminal from above and removed from it in an upward direction, the frame proper does not contact the visual display terminal, to assure very excellent handling convenience.

The optical filter for visual display terminals in one embodiment has a height adjusting member between the top face of the main body of the visual display terminal and the top face of the frame proper to correct the deviation in vertical relative position, when the screen may be out of alignment with the filter proper in the vertical direction depending on the kind of the visual display terminal.

The optical filter for visual display terminals according to another embodiment can prevent the optical filter from falling off by the engagement between the two engaging portions even if an impact, etc. is applied, and since the filter mounting means is mounted at the center on the top face, the number of the filter mounting means can be kept at one to avoid complication of the structure. Furthermore, the optical filter can be simply removed by lifting it upward.

The optical filter for visual display terminals according to another feature can prevent the optical filter from falling off by engagement between the engaging portion and the filter mounting means even if an impact, etc. is applied.

The optical filter for visual display terminals according to another embodiments allows the optical filter to be mounted onto the visual display terminal without giving any significant feeling of incompatibility, since the top plate and the side plates can be tilted at any optional positions to suit the shape and size of the visual display terminal, and connected by the corner members.

The optical filter for visual display terminals according to another embodiment can prevent the optical filter from falling off by engagement between the two engaging portions even if an impact, etc. is applied, and since the filter mounting means is mounted at the center on the top face, the number of filter mounting means can be kept at one to avoid the complication of structure. Furthermore, the optical filter can be simply removed by lifting it upward.

The optical filter for visual display terminals according to still another embodiment can prevent the optical filter from falling off by engagement between the engaging portion and the filter mounting means even if an impact, etc. is applied.

INDUSTRIAL APPLICABILITY

The present invention can present an optical filter for visual display terminals, which can be mounted onto any kinds of visual display terminals without any limitation without giving any substantial feeling of incompatibility.

What is claimed is:

1. An adjustable wraparound optical filter assembly for attachment to a visual display terminal having a main body, which filter assembly comprises an optical filter having a shape generally corresponding to at least a portion of the shape of said visual display terminal, and having a supporting frame connected for holding said optical filter in place, wherein said supporting frame has a predetermined depth and a front shape that corresponds substantially to the shape of said main body of said visual display terminal, and is constructed for holding said optical filter, and wherein side frame members are provided on both sides of said supporting frame, said side frame members being horizontally adjustable in relative positions relative to said supporting frame, further comprising means providing an engaging portion on the top face of said frame, and a filter mounting means detachably engageable with said engaging portion, and wherein said filter mounting means is fixable on the top face of said main body of said visual display terminal, to keep said optical filter mounted onto said visual display terminal.

2. An optical filter of claim 1, wherein the said supporting frame is open at least at the bottom.

3. An optical filter of claim 1 or 2, further comprising a height adjusting member positionable between the top face of said main body of said visual display terminal and the top face of said supporting frame, for adjusting the relative vertical position between the screen of the visual display terminal and said optical filter.

4. An adjustable wraparound optical filter assembly for attachment to a visual display terminal having a main body, which filter assembly comprises an optical filter having a shape generally corresponding to at least a portion of the shape of said visual display terminal, and having a supporting frame connected for holding said optical filter in place, wherein said supporting frame has a predetermined depth and a front shape that corresponds substantially to the shape of said main body of said visual display terminal, and is constructed for holding said optical filter, and wherein side frame members are provided on both sides of said supporting frame, said side frame members being horizontally adjustable in relative positions relative to said supporting frame, and further comprising an engaging portion provided on at least one of said side frame members of said frame, and a filter mounting means detachably engageable with said engaging portion, and wherein said filter mounting means is fixable on at least one side of said main body of said visual display terminal, to keep said filter mounted onto said visual display terminal.

5. An adjustable wraparound optical filter assembly for attachment to a visual display terminal having a main body, which optical filter assembly comprises:

(a) a frame comprising (1) a first front plate member defining an opening to be covered with an optical filter and (2) a top plate member connected to said first front plate member along the top edge thereof and extending rearwardly from said first front plate member for positioning adjacent to a top face of said visual display terminal, and (b) side frame members extending along side edges of said frame, each of which comprises (1) a second front plate member and (2) a side plate member connected to said second front plate member along the outer side edge thereof and extending rearwardly from said second front plate member for positioning adjacent to a side face of said visual display terminal, wherein at least one of said top plate member and said side frame members is attachable to said main body of said visual display terminal, and wherein at least one of said side frame members is slidably supported for movement in a horizontal direction at the rear of said first front plate member such that the rear surface of said first front plate member and the front surface of said second front plate member of said slidably supported side frame member are faced toward each other.

6. The adjustable wraparound optical filter assembly defined in claim 5, wherein at least the bottoms of said frame are open.

7. The adjustable wraparound optical filter assembly defined in claim 5, further comprising a height adjusting member positionable between the top portion of said main body of said visual display terminal and said top plate member of said frame, for adjusting the relative vertical position between the screen of the visual display terminal and said optical filter.

8. The adjustable wraparound optical filter assembly defined in claim 5, wherein engaging means is provided on said top plate member of said frame and a frame mounting means is engageable with said engaging portion, and wherein said frame mounting means is fixable on the top portion of said main body of said visual display terminal, to keep said frame mounted onto said visual display terminal.

9. The adjustable wraparound optical filter assembly defined in claim 5, wherein engaging means is provided on at least one of said side frame members, and a frame mounting means is detachably engageable with said engaging portion, and wherein said frame mounting means is fixable on at least one side of said main body of said visual display terminal, to keep said frame mounted onto said visual display terminal.

10. The adjustable wraparound optical filter assembly defined in claim 5, wherein said slidably supported side frame member is supported with a sliding mechanism provided on the rear of said first front plate member at both upper and lower positions.

11. The adjustable wraparound optical filter assembly defined in claim 10, wherein said sliding mechanism has a stopping mechanism for providing said slidably supported side frame member with a predetermined range of movement.

12. The adjustable wraparound optical filter assembly defined in claim 10, wherein said sliding mechanism is located substantially at a position corresponding to the horizontal width of said opening defined by said first front plate member.

13. The adjustable wraparound optical filter assembly defined in claim 10, wherein said sliding mechanism comprises a key formed on the rear surface of said first front plate member and a key way defined on the second front plate member positioned for engaging said key.

14. The adjustable wraparound optical filter assembly defined in claim 13, further comprising a pressure plate for pressing a side portion of said optical filter toward the rear portion of said first front plate member which is engaged with said key and said key way.

15. An adjustable wraparound optical filter assembly for attachment to a visual display terminal having a main body, which optical filter assembly comprises:

(a) a frame comprising (1) a first front plate member defining an opening to be covered with an optical filter and (2) a top plate member connected to said first front plate member along the top edge thereof, (b) side frame members each of which comprises (1) a second front plate member and (2) a side plate member connected to said second front plate member along the outer side edge thereof, and (c) a filter mounting member attachable to said main body of said visual display terminal for releasable engagement of said frame, wherein at least one of said side frame members is slidably supported for movement in a horizontal direction at the rear of said first front plate member such that the rear surface of said first front plate member and the front surface of said second front plate member of said slidably supported side frame member are faced toward each other.

* * * * *

UNITED STATES PATENT AND TRADEMARK OFFICE
CERTIFICATE OF CORRECTION

PATENT NO. : 5,754,259
DATED : May 19, 1998
INVENTOR(S) : Osamu Nakamatsu and Hiroshi Matsumoto It is certified that error appears in the above-indentified patent and that said Letters Patent is hereby corrected as shown below:

Title page item [54] and col. 1, please change the title from "OPTICAL FILTER FOR VISUAL DISPLAY TERMINALS" to --ADJUSTABLE WRAPAROUND OPTICAL FILTER FOR VISUAL DISPLAY TERMINALS--; and at column 8, line 2, please change "embodiments" to --embodiment--.

Signed and Sealed this

Twenty-fourth Day of November, 1998

BRUCE LEHMAN

Attest:

Attesting Officer

Commissioner of Patents and Trademarks